US009529088B2

(12) United States Patent
Kim et al.

(10) Patent No.: US 9,529,088 B2
(45) Date of Patent: Dec. 27, 2016

(54) APPARATUS AND METHOD FOR DETERMINING AVAILABLE DRIVING SPACE

(71) Applicants: HYUNDAI MOBIS CO., LTD., Seoul (KR); The Industry & Academic Cooperation in Chungnam National University (IAC), Daejeon (KR)

(72) Inventors: Jeong Ku Kim, Yongin-si (KR); Seul Jung, Daejeon (KR); Yun Ho Ko, Daejeon (KR)

(73) Assignees: HYUNDAI MOBIS CO., LTD., Seoul (KR); The Industry & Academic Coorperation in Chungnam National University (IAC), Daejeon (KR)

( * ) Notice: Subject to any disclaimer, the term of this patent is extended or adjusted under 35 U.S.C. 154(b) by 65 days.

(21) Appl. No.: 14/597,879

(22) Filed: Jan. 15, 2015

(65) Prior Publication Data

US 2016/0131762 A1    May 12, 2016

(30) Foreign Application Priority Data

Nov. 7, 2014    (KR) .......................... 10-2014-0154319

(51) Int. Cl.
*G01C 22/00*    (2006.01)
*G05D 1/00*    (2006.01)
*G01S 17/93*    (2006.01)
*G05D 1/02*    (2006.01)

(52) U.S. Cl.
CPC ............. *G01S 17/936* (2013.01); *G05D 1/024* (2013.01)

(58) Field of Classification Search
CPC ...... G01S 17/936; G01S 17/93; G05D 1/0055; G05D 1/0088; G05D 1/00
USPC ...................... 701/1.23, 26, 28, 41, 301, 302
See application file for complete search history.

(56) References Cited

U.S. PATENT DOCUMENTS

| 7,667,581 B2 * | 2/2010 | Fujimoto ........... G06K 9/00805 340/425.5 |
| 8,126,642 B2 | 2/2012 | Trepagnier et al. |
| 8,411,900 B2 * | 4/2013 | Naka .................. G06K 9/00798 340/436 |

(Continued)

FOREIGN PATENT DOCUMENTS

| JP | 2014-2638 A | 1/2014 |
| KR | 10-2010-0052691 A | 5/2010 |

(Continued)

*Primary Examiner* — Jaime Figueroa
(74) *Attorney, Agent, or Firm* — NSIP Law

(57) ABSTRACT

Provided is an apparatus for determining an available driving space, including a laser distance sensor installed in a vehicle and configured to sense a region in front of the vehicle by a predetermined distance to generate distance information, a signal processing unit configured to generate plane distance information by using the distance information generated by the laser distance sensor, a curb searching unit configured to determine correlation and similarity between the generated plane distance information and previous plane distance information to search for a curb, and a determining unit configured to determine whether the region in front of the vehicle by the predetermined distance is an available driving space depending on whether a route of a curb searched by the curb searching unit is included in a driving region.

18 Claims, 3 Drawing Sheets

(56) References Cited

U.S. PATENT DOCUMENTS

| | | | |
|---|---|---|---|
| 8,954,217 B1* | 2/2015 | Montemerlo | B60W 30/00 701/26 |
| 9,074,906 B2* | 7/2015 | Higuchi | G01C 21/3602 |
| 9,321,461 B1* | 4/2016 | Silver | B60W 30/0956 |
| 2002/0101210 A1* | 8/2002 | Boisvert | B60J 7/0573 318/469 |
| 2007/0156286 A1* | 7/2007 | Yamauchi | G05D 1/0038 700/245 |
| 2007/0274566 A1* | 11/2007 | Fujimoto | G06K 9/00805 382/103 |
| 2009/0169052 A1* | 7/2009 | Seki | G06T 7/0044 382/103 |
| 2011/0063097 A1* | 3/2011 | Naka | G06K 9/00798 340/435 |
| 2013/0266187 A1* | 10/2013 | Bulan | G06K 9/00785 382/104 |
| 2013/0282268 A1* | 10/2013 | Goerick | B60W 30/095 701/301 |
| 2015/0165972 A1* | 6/2015 | Takemae | G06T 7/0075 348/148 |
| 2016/0026184 A1* | 1/2016 | Olshansky | G05D 1/0214 356/4.01 |

FOREIGN PATENT DOCUMENTS

| | | |
|---|---|---|
| KR | 10-1000332 B1 | 12/2010 |
| KR | 10-2013-0130105 A | 12/2013 |

* cited by examiner

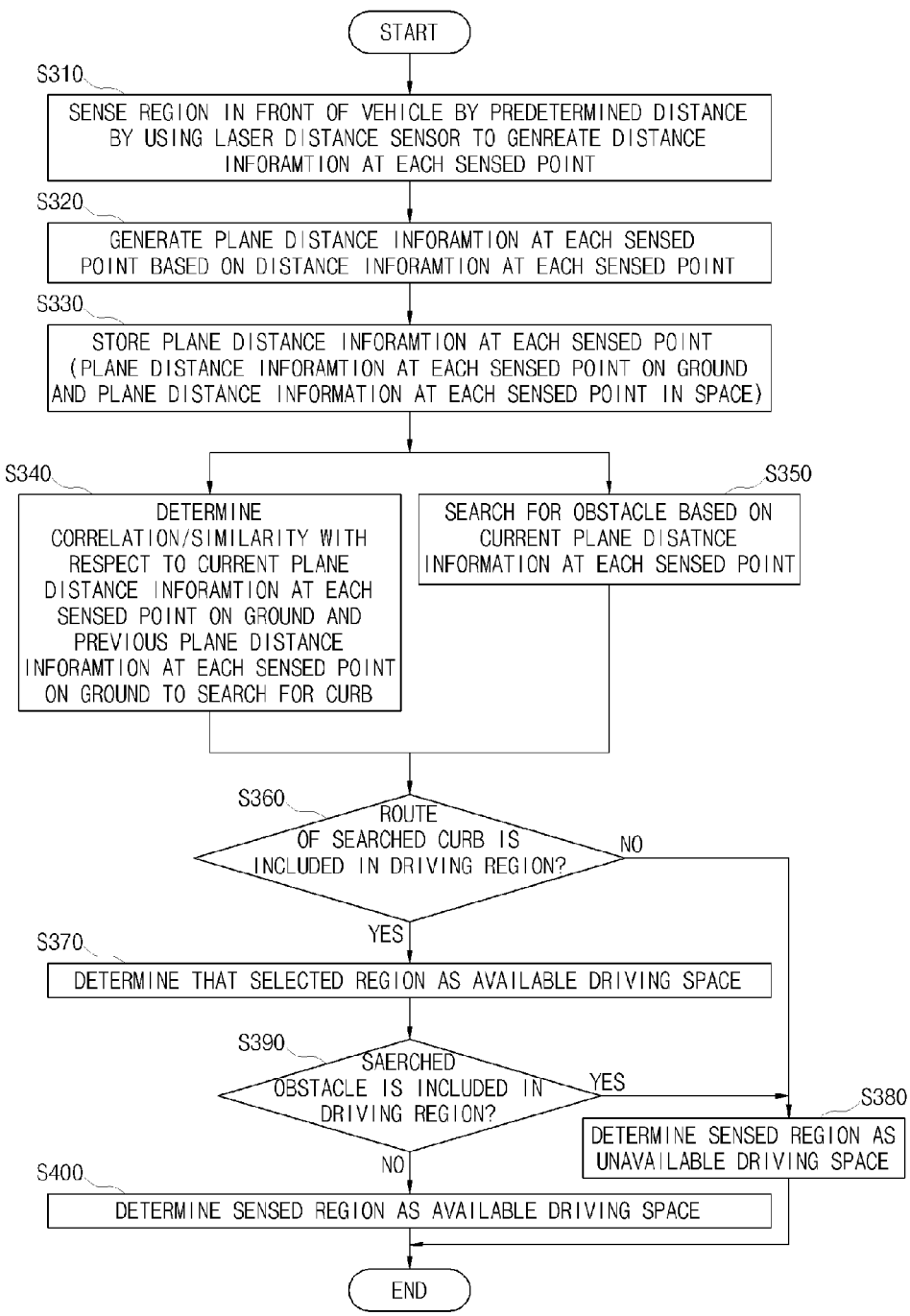

APPARATUS AND METHOD FOR DETERMINING AVAILABLE DRIVING SPACE

CROSS-REFERENCE TO RELATED APPLICATIONS

This application claims priority under 35 U.S.C. §119 to Korean Patent Application No. 10-2014-0154319, filed on Nov. 7, 2014, the disclosure of which is incorporated herein by reference in its entirety.

TECHNICAL FIELD

The present invention relates to an apparatus and method for determining an available driving space, and more particularly, to an apparatus and method for sensing a curb and an obstacle in a driving route of an unmanned autonomous vehicle and determining whether the driving route is an available driving space.

BACKGROUND

In general, in order to ensure safe driving, unmanned autonomous vehicles detect an obstacle positioned in a driving direction and determine a driving direction by using the detected information. However, when an unmanned autonomous vehicle needs to carry out a particular purpose, while driving outdoors, rather than indoors, it is important for the vehicle not to collide with an obstacle present on the ground.

Running on the roadway, such an unmanned autonomous vehicle should drive, without colliding with the sidewalk protruded to be higher than the road, and thus, it is necessary for the unmanned autonomous vehicle to detect a curb as a boundary stone between the roadway and the sidewalk. A curb is an important mark present on the road, and thus, finding a curb ensures safe driving of the unmanned autonomous vehicle.

In a related art curb detecting method, a curb is detected by utilizing sensor information obtained mainly from the side of a curb. Namely, in the related art, since the side of a curb is perpendicular to the ground, a curb is detected by using the characteristics that distance sensor information is rapidly changed in a curb portion.

However, an amount of the sensor information obtained from the side of a curb is so small that, if only the side information of the curb is used, curb detection performance is easily affected by an external factor, noise of a sensor, and the like, and it is difficult to recognize a curb present at a distance from a vehicle. For example, in public facilities, the side of a curb is short with a length ranging from 6 cm to 15 cm, and thus, only a small amount of information is obtained from the side of a curb. Thus, when a distance to a curb is long, it may be difficult to obtain information sufficient for differentiating the ground and a curb. Namely, it is difficult to detect a curb at a distance with the related art method.

In addition, in the related art method for detecting a curb, the side of a curb which is partially damaged or which is partially covered with fallen leaves cannot be accurately detected and sensor information includes a great amount of errors, resulting in failure to accurately detect a curb.

As a solution to the problem, Korean Patent Laid Open Publication No. 10-2012-0052691 (published on May 24, 2012) (hereinafter, referred to as a "related art") discloses a method for detecting a curb as a boundary stone between a roadway and a sidewalk by comparing information obtained by a distance sensor installed in a vehicle and a previously designed curb model.

According to the related art, a curb can be detected stably under various environmental conditions by using upper and lower horizontal planes of a curb, as well as the side of a curb, and mathematically comparing a curb model with distance sensor information.

However, the related art has a problem in that only a predetermined region from a vehicle can be detected, only a following space in which a vehicle has moved in a section sensed by a distance sensor can be recognized, and a running vehicle cannot recognize an available driving space because it fails to detect a curb in a large space.

In addition, a recognition rate may be lowered in a section in which a height of a curb is low, and several sections of a curb cannot be simultaneously measured in real time.

SUMMARY

Accordingly, the present invention provides an apparatus and method for determining whether a movement path of an unmanned vehicle is an available driving space based on a curb and an obstacle positioned in a driving route.

In one general aspect, an apparatus for determining an available driving space includes: a laser distance sensor installed in a vehicle and configured to sense a region in front of the vehicle by a predetermined distance to generate distance information; a signal processing unit configured to generate plane distance information by using the distance information generated by the laser distance sensor; a curb searching unit configured to determine correlation and similarity between the generated plane distance information and previous plane distance information to search for a curb; and a determining unit configured to determine whether the region in front of the vehicle by the predetermined distance is an available driving space depending on whether a route of a curb searched by the curb searching unit is included in a driving region.

When the route of the curb is included in the driving region, the determining unit may determine that the region in front of the vehicle by the predetermined distance is an available driving space, and when the route of the curb is not included in the driving region, the determining unit may determine that the region in front of the vehicle by the predetermined distance is an unavailable driving space.

The apparatus for determining an available driving space may further include: an obstacle searching unit configured to search for an obstacle by using the plane distance information generated by the signal processing unit.

When it is determined that the region in front of the vehicle by a predetermined distance is an available driving space, the determining unit may determine whether the obstacle searched by the obstacle searching unit is included in the driving region to determine whether the region in front of the vehicle by the predetermined distance is an available driving space.

The signal processing unit may cancel noise included in the distance information and convert the noise-canceled distance information into plane coordinates to generate the plane distance information.

After generating the plane distance information, the signal processing unit may determine similarity of linear and curved lines with respect to the canceled noise, and when it is determined that the canceled noise is valid distance information according to the determination result, the signal processing unit may restore the corresponding canceled noise information to plane distance information.

The laser distance sensor may sense a plurality of points of the ground to generate a plurality of distance information at each sensed point on the ground and sense a plurality of points in a front space to generate a plurality of distance information at each sensed point in the space.

The signal processing unit may generate plane distance information at each sensed point on the ground based on the distance information at each sensed point on the ground, and generate plane distance information at each sensed point in the space based on the distance information at each sensed point in the space.

The curb searching unit may determine correlation between information included in the distance information at each sensed point on the ground provided from the signal processing unit, and determine similarity between the distance information at each sensed point on the ground provided from the signal processing unit and previous distance information at each sensed point on the ground stored in the storage unit.

In another general aspect, a method for determining an available driving space includes: sensing a region in front of a vehicle by a predetermined distance by using a laser distance sensor installed in the vehicle to generate distance information; generating plane distance information by using the generated distance information; determining correlation and similarity between the generated plane distance information and previous plane distance information to search for a curb; and determining whether the region in front of the vehicle by the predetermined distance is an available driving space or an unavailable driving space depending on a searched curb.

The determining whether the region in front of the vehicle by the predetermined distance is an available driving space or an unavailable driving space may include: when a route of the curb is included in the driving region, determining that the region in front of the vehicle by the predetermined distance is an available driving space; and when the route of the curb is not included in the driving region, determining that the region in front of the vehicle by the predetermined distance is an unavailable driving space.

The generating of distance information may include: generating the distance information at each sensed point on the ground by sensing a plurality of points of the ground; and generating the distance information at each sensed point in the space by sensing a plurality of points in the front space.

The method may further include: searching for an obstacle in front of the vehicle by the predetermined distance based on the generated plane distance information.

The method may further include: when it is determined that the region in front of the vehicle by the predetermined distance is an available driving space according to the curb search result and when the searched obstacle is not positioned in the available driving space, finally determining that the corresponding region is an available driving space.

The generating of plane distance information may include: canceling noise included in the distance information; and converting the noise-canceled distance information into plane coordinates to generate the plane distance information.

Other features and aspects will be apparent from the following detailed description, the drawings, and the claims.

BRIEF DESCRIPTION OF THE DRAWINGS

FIG. 3 is a flow chart illustrating operations of a method for determining an available driving space according to an embodiment of the present invention.

DETAILED DESCRIPTION OF EMBODIMENTS

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the specification, like numerals denote like components.

In describing the present invention, a detailed description of known techniques associated with the present invention unnecessarily obscure the gist of the present invention, it is determined that the detailed description thereof will be omitted. Moreover, the terms used henceforth have been defined in consideration of the functions of the present invention, and may be altered according to the intent of a user or operator, or conventional practice. Therefore, the terms should be defined on the basis of the entire content of this specification.

Hereinafter, an apparatus and method for determining an available driving space according to embodiments of the present invention will be described in detail with reference to the accompanying drawings.

Figure 1:
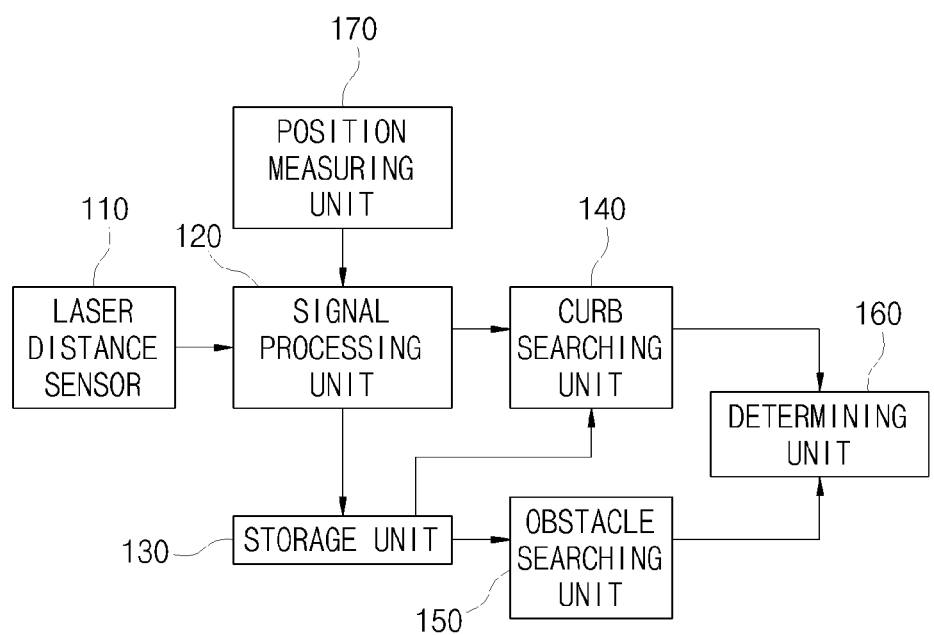
FIG. 1 is a block diagram of an apparatus for determining an available driving space according to an embodiment of the present invention.

FIG. 1 is a block diagram of an apparatus for determining an available driving space according to an embodiment of the present invention.

Referring to FIG. 1, the apparatus for determining an available driving space according to an embodiment of the present invention may include a laser distance sensor 110, a signal processing unit 120, a storage unit 130, a curb searching unit 140, an obstacle searching unit 150, a determining unit 160, and a position measuring unit 170.

The laser distance sensor 110 is installed in a vehicle and senses a region in front of the vehicle by a predetermined distance to generate distance information. Here, the laser distance sensor 110 senses the ground and a front space.

Since the laser distance sensor 110 simultaneously senses a plurality of points of the ground and a plurality of points of the front space, it can generate a plurality of distance information. Here, in order to sense a curb, a boundary stone between a roadway and a sidewalk, the laser distance sensor 110 senses the ground, and in order to sense an obstacle in a driving route of the vehicle, the laser distance sensor 110 senses a front space.

Figure 2:
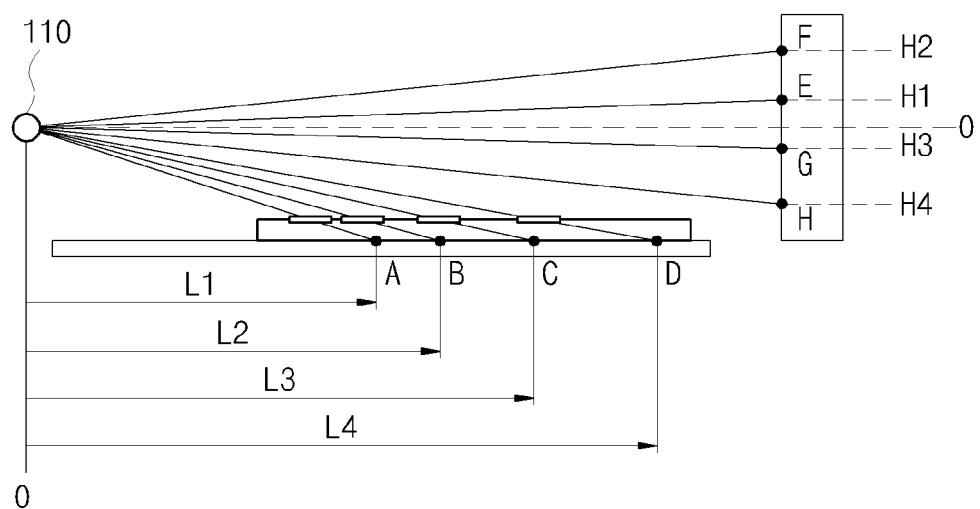
FIG. 2 is a view illustrating an example of sensing eight points by a laser distance sensor.

FIG. 2 is a view illustrating an example of sensing eight points by a laser distance sensor.

In FIG. 2, an example in which eight laser distance sensors 110 sense eight points is illustrated.

The laser distance sensor 110 senses four points A, B, C, and D at different distances on the ground and senses four points E, F, G, and H at different levels in a front space. Here, the number of regions sensed by the laser distance sensor 110, the distances of the sensed points L1 to L4, and the levels of the sensed points H1 to H4 may be variously set.

The laser distance sensor 110 may include a plurality of sensors and be implemented such that some of the plurality of sensors sense the ground and the others sense a front space.

Hereinafter, a point sensed by the laser distance sensor 110 will be referred to as a "sensed point" and distance information generated at each sensed point will be referred to as "distance information at each sensed point".

Thus, the laser distance sensor 110 generates a plurality of distance information at each sensed point, and since the laser distance sensor 110 senses a plurality of points of the ground and a plurality of points in a front space, the distance information at each sensed point may be classified as distance information at each sensed point of the ground and distance information at each sensed point in a space The signal processing unit 120 receives distance information at each sensed point from the laser distance sensor 110, and generates plane distance information at each sensed point by using the distance information at each sensed point.

The signal processing unit 120 cancels noise included in the distance information at each sensed point and converts the noise-canceled distance information at each sensed point into plane coordinates to generate plane distance information. Here, noise refers to things other than a curb, such as the ground, road facilities (e.g., a road sign, etc.).

The signal processing unit 120 compares noise canceled during the noise canceling process to determine similarities of linear lines, curved lines, and the like, and restores information determined as valid information, rather than noise, to generated plane distance information.

According to an embodiment of the present invention, since the laser distance sensor 110 senses the ground and a front space, the distance information at each sensed point generated by the signal processing unit 120 includes plane distance information at each sensed point of the ground and plane distance information at each sensed point in a space.

The plane distance information at each sensed point generated by the signal processing unit 120 is stored in the storage unit 130 and simultaneously provided to the curb searching unit 140.

Here, the plane distance information at each sensed point of the ground is transmitted to the curb searching unit 140, and the plane distance information at each sensed point of the ground and the plane distance information at each sensed point in a space may be stored in the storage unit 130.

The signal processing unit 120 may generate the plane distance information at each sensed point by using vehicle position information provided from the position measuring unit 170.

The storage unit 130 stores the plane distance information at each sensed point generated by the signal processing unit 120, and the plane distance information at each sensed point stored in the storage unit 130 is used to search for a curb and an obstacle.

In particular, among the plane distance information at each sensed point stored in the storage unit 130, the plane distance information at each sensed point of the ground is used for the curb searching unit to search for a curb, and the plane distance information at each sensed point in a space may be used for the obstacle searching unit 150 to search for an obstacle.

Based on the plane distance information at each sensed point on the ground provided from the signal processing unit 120 and the plane distance information at each sensed point on the ground stored in the storage unit 130, the curb searching unit 140 determines correlation and similarity to search for a curb.

The curb searching unit 140 receives the plane distance information at each sensed point on the ground provided from the signal processing unit 120, and determines correlation of information included in the distance information at each sensed point on the ground.

The curb searching unit 140 determines similarity between the plane distance information at each sensed point on the ground provided from the signal processing unit 120 and the plane distance information at each sensed point on the ground stored in the storage unit 130.

Here, the curb searching unit 140 connects the plane distance information at each sensed point on the ground to group the same, and determines similarity therebetween by using the grouped plane distance information at each sensed point on the ground.

When the correlation and similarity between the distance information are determined, the curb searching unit 140 provides a weight value to the distance information at each sensed point on the ground to search for a curb.

The obstacle searching unit 150 searches for an obstacle based on the plane distance information at each sensed point in a space stored in the storage unit 130.

The search results from the curb searching unit 140 and the obstacle searching unit 150 are provided to the determining unit 160.

The determining unit 160 determines whether a route of a curb searched by the curb searching unit 140 is included in a driving region, and when a route of the curb is included in the driving region, the determining unit 160 determines that the current region is an available driving space, and when the route of the curb is not included in the driving region, the determining unit 160 determines that the current region is an unavailable driving space.

In addition, in the case in which the route of the curb is determined as being an available driving space, if an obstacle searched by the obstacle searching unit 150 is included in the driving region, the determining unit 160 finally determines that the current region is an unavailable driving space, and if an obstacle searched by the obstacle searching unit 150 is not included in the driving region, the determining unit 160 finally determines that the current region is an available driving space.

So far, the configuration of the apparatus for determining an available driving space according to an embodiment of the present invention has been described. Hereinafter, operations of the apparatus for determining an available driving space according to an embodiment of the present invention in stages will be described.

FIG. 3 is a flow chart illustrating operations of a method for determining an available driving space according to an embodiment of the present invention in stages.

Referring to FIG. 3, a region in front of a vehicle by a predetermined distance is sensed by using the laser distance sensor 110 installed in the vehicle to generate distance information in step S310. Here, a plurality of points of the ground and a plurality of points in a space are sensed.

In the following descriptions, a point sensed by the laser distance sensor 110 will be referred to as a "sensed point," and distance information generated at each sensed point will be referred to as "distance information at each sensed point."

According to an embodiment of the present invention, since a plurality of points of the ground and a plurality of points in a space are sensed, distance information at each sensed point may be classified as distance information at each sensed point on the ground and distance information at each sensed point in a space.

By using the distance information generated in step S310, plane distance information at each sensed point is generated in step S320. Here, since the distance information at each sensed point includes distance information at each sensed point on the ground and distance information at each sensed point in a space, the plane distance information at each sensed point includes plane distance information at each sensed point on the ground and plane distance information at each sensed point in a space.

The plane distance information at each sensed point is generated by canceling noise included in the distance information and subsequently converting the noise-canceled distance information into plane coordinates.

Also, when the noise canceled during the noise canceling process is determined as being valid information, rather than noise, using similarities of linear and curved distances, the noise determined as being valid information is restored to plane distance information at each sensed point.

In a case in which the plane distance information at each sensed point is generated in step S320, the plane distance information at each sensed point may be generated by using vehicle position information obtained through a global positioning system (GPS).

The generated plane distance information at each sensed point (including the plane distance information at each sensed point on the ground and the plane distance information at each sensed point in a space) is stored in the memory in step S330.

Based on the plane distance information at each sensed point on the ground (current plane distance information at each sensed point) generated in step S320 and the plane distance information at each sensed point (previous planar distance information at each sensed point) stored in the storage unit in advance, correlation and similarity are determined to search for a curb in step S340.

Here, correlation between the current planar distance information at each sensed point on the ground is determined, and similarity between current planar distance information at each sensed point on the ground and previously plane distance information at each sensed point on the ground is determined.

When a curb is searched in step S340, an obstacle is simultaneously searched based on the distance information at each sensed point in a space (current plane distance information at each sensed point in a space) stored in the memory in step S350.

Thereafter, it is determined whether a route of a searched curb is included in a driving region in step S360, and when a route of the searched curb is included in a driving region (S360: Yes), the currently sensed region is determined as an available driving space in step S370, and when the route of the searched curb is not included in a driving region (S360: No), the currently sensed region is determined as an unavailable driving space in step S380.

In a state in which the route of the searched curb is included in the driving region, namely, in the state in which the currently sensed region is determined as an available driving region, it is determined whether a searched obstacle is positioned in the driving region in order to determine a final available driving space in step S390.

When a searched obstacle is positioned in the driving region according to the determination result, the sensed region is finally determined as being an unavailable driving space in step S380, and when it is determined that the searched obstacle is not positioned in the driving region, the sensed region is finally determined as being an available driving space in step S400.

According to embodiments of the present invention, based on a curb and an obstacle positioned in a driving route, it is determined whether a movement route of an unmanned vehicle is an available driving space.

In particular, when the apparatus and method for determining an available driving space according to embodiments of the present invention are used, a curb in a large space can be detected, an available driving space can be determined stably and accurately.

In addition, since a plurality of points of the ground are simultaneously sensed to sense a curb as a boundary stone between a roadway and a sidewalk, a recognition rate of a curb can be increased.

The apparatus and method for determining an available driving space has been described according to the embodiments, but the scope of the present invention is not limited to a specific embodiment. The present invention may be corrected and modified within the technical scope obvious to those skilled in the art.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for determining an available driving space, the apparatus comprising:
   a laser distance sensor installed in a vehicle and configured to sense a region in front of the vehicle by a predetermined distance to generate distance information;
   a signal processing unit configured to generate plane distance information by using the distance information generated by the laser distance sensor;
   a curb searching unit configured to determine correlation and similarity between the generated plane distance information and previous plane distance information to search for a curb; and
   a determining unit configured to determine whether the region in front of the vehicle by the predetermined distance is an available driving space depending on whether a route of a curb searched by the curb searching unit is included in a driving region.

2. The apparatus of claim 1, wherein when the route of the curb is included in the driving region, the determining unit determines that the region in front of the vehicle by the predetermined distance is an available driving space, and when the route of the curb is not included in the driving region, the determining unit determines that the region in front of the vehicle by the predetermined distance is an unavailable driving space.

3. The apparatus of claim 1, further comprising an obstacle searching unit configured to search for an obstacle by using the plane distance information generated by the signal processing unit.

4. The apparatus of claim 3, wherein the determining unit determines whether the obstacle searched by the obstacle searching unit is included in the driving region, in response to determining that the route of a curb searched by the curb searching unit is included in a driving region, to determine whether the region in front of the vehicle by the predetermined distance is an available driving space.

5. The apparatus of claim 1, wherein the signal processing unit cancels noise included in the distance information and converts the noise-canceled distance information into plane coordinates to generate the plane distance information.

6. The apparatus of claim 5, wherein, after generating the plane distance information, the signal processing unit determines similarity of linear and curved lines with respect to the canceled noise, and when it is determined that the canceled noise is valid distance information according to the determination result, the signal processing unit restores the corresponding canceled noise information to plane distance information.

7. The apparatus of claim 1, wherein the laser distance sensor senses a plurality of points of the ground to generate a plurality of distance information at each sensed point on the ground and senses a plurality of points in a front space to generate a plurality of distance information at each sensed point in the space.

8. The apparatus of claim 7, wherein the signal processing unit generates plane distance information at each sensed point on the ground based on the distance information at each sensed point on the ground, and generates plane distance information at each sensed point in the space based on the distance information at each sensed point in the space.

9. The apparatus of claim 8, wherein the curb searching unit determines correlation between information included in the distance information at each sensed point on the ground provided from the signal processing unit, and determines similarity between the distance information at each sensed point on the ground provided from the signal processing unit and previous distance information at each sensed point on the ground stored in the storage unit.

10. A method for determining an available driving space, the method comprising:
    sensing a region in front of a vehicle by a predetermined distance by using a laser distance sensor installed in the vehicle to generate distance information;
    generating plane distance information by using the generated distance information;
    determining correlation and similarity between the generated plane distance information and previous plane distance information to search for a curb; and
    determining whether the region in front of the vehicle by the predetermined distance is an available driving space or an unavailable driving space depending on a searched curb.

11. The method of claim 10, wherein the determining whether the region in front of the vehicle by the predetermined distance is an available driving space or an unavailable driving space comprises:
    when a route of the curb is included in the driving region, determining that the region in front of the vehicle by the predetermined distance is an available driving space; and
    when the route of the curb is not included in the driving region, determining that the region in front of the vehicle by the predetermined distance is an unavailable driving space.

12. The method of claim 10, wherein the generating of distance information comprises:
    generating the distance information at each sensed point on the ground by sensing a plurality of points of the ground; and
    generating the distance information at each sensed point in the space by sensing a plurality of points in the front space.

13. The method of claim 12, further comprising: searching for an obstacle in front of the vehicle by the predetermined distance based on the generated plane distance information.

14. The method of claim 13, further comprising: finally determining that the corresponding region is an available driving space, in response to determining that the region in front of the vehicle by the predetermined distance is an available driving space according to the curb search result and when the searched obstacle is not positioned in the available driving space.

15. The method of claim 10, wherein the generating of plane distance information comprises:
    canceling noise included in the distance information; and
    converting the noise-canceled distance information into plane coordinates to generate the plane distance information;
    sensing a region in front of a vehicle by a predetermined distance by using a laser distance sensor installed in the vehicle to generate distance information.

16. The method of claim 10, wherein the laser distance sensor comprises a first laser sensor sensing the ground and a second laser sensor sensing the region front of the vehicle.

17. The method of claim 16, wherein the second laser sensor senses by the predetermined distance.

18. The method of claim 16, wherein the search for the curb is based on the current planar distance information for the first laser sensor and a previous planar distance for the first sensor.

\* \* \* \* \*